United States Patent [19]

Osburn

[11] 3,766,947

[45] Oct. 23, 1973

[54] FLUID TIGHT CLOSURE
[75] Inventor: Coy D. Osburn, Tulsa, Okla.
[73] Assignee: T. D. Williamson, Inc., Tulsa, Okla.

[22] Filed: June 5, 1972
[21] Appl. No.: 259,832

[52] U.S. Cl.................. 138/89, 220/55 J, 220/46 R
[51] Int. Cl............................................... F16l 55/10
[58] Field of Search.......................... 138/89, 90, 92;
    220/55 J, 55 Y, 46 R; 269/243; 74/424.8 R

[56] References Cited
UNITED STATES PATENTS
592,199   10/1897   Fletcher........................... 269/243 X
2,196,895  4/1940   Bowman ............................ 220/46 R
2,771,096  11/1956  VerNoot ........................ 220/55 R X
2,797,948  7/1957   Tangard........................... 220/55 J X Primary Examiner—Charles A. Ruehl
Attorney—W. F. Hyer et al.

[57] ABSTRACT

This invention relates to apparatus for forming a fluid tight closure of an opening in a vessel. The apparatus includes a conduit or fitting adapted to be connected to the vessel, a plug insertable into the conduit and a means for locking the plug in the conduit to prevent the plug from moving out of the conduit. The locking means includes a locking element engageable with the plug to lock it in place. A connector located in a lateral bore through the conduit is connected at one end of the locking element and its other end has a threaded engagement with a nut also located in the lateral bore. Stops are provided at opposite ends of the nut so that upon rotation of the nut to move the connector and locking element between retracted and locking positions, the nut will alternately engage the stops. By making the distance between the stops greater than the length of the nut, the nut is free to move longitudinally between the stops and this construction avoids maintaining close manufacturing tolerances with respect to the distance between the stops. In a preferred embodiment, the inner stop is provided by a shoulder between an outer larger diameter portion of the bore and an inner smaller diameter portion. A seal is carried by the connector to seal between it and the smaller diameter portion of the bore as the connector is reciprocated by turning the nut. Normally the locking element will engage the conduit when in fully retracted position to limit makeup of the nut on the connector and hence limit the outward travel of the connector so as to maintain the seal within the smaller diameter portion of the bore. However, if excessive torque is applied to the nut so as to break the engagement of the connector with the locking element, means are provided to limit further makeup of the nut on the connector and the seal is located so as to remain within the smaller diameter portion of the bore when the nut has a maximum makeup on the connector and both have been displaced outwardly so the nut is in engagement with the outer stop. With this construction, the connector does not rotate thereby enabling it to have a simple bifurcated connection with the locking element and to carry a seal which merely slides along the bore in the conduit without rotation. The seal also isolates the threaded connection from fluids within the vessel.

11 Claims, 4 Drawing Figures

3,766,947

PATENTED OCT 23 1973

FLUID TIGHT CLOSURE

This invention relates to apparatus for forming a fluid tight closure; and, more particularly, to improvements in that type of apparatus shown in U.S. Pat. No. 2,771,096.

It is sometimes desirable to "hot tap" a pipeline or vessel through a fitting connected to a vessel and having a side opening, such as a tee. Also, after the hot tapping operation has been completed, it may be desired to plug the fitting. One method of performing this operation involves mounting upon the vessel, in the order named and in superimposed relation, a tee or other side opening conduit, a tapping valve, and a hot tapping machine. When properly assembled, the machine is operated to run a cutter on the boring bar of the machine through the open valve and conduit to cut a hole in the portion of the vessel surrounded by the conduit. Upon retraction of the boring bar and closing the tapping valve, the tapping machine can be removed and the cutter replaced by a plug having a suitable releasable connection with the boring bar. The plug is run through the open tapping valve into place into the conduit where it is locked in position to form a fluid tight seal across the conduit. Then the tapping valve and the tapping machine can be removed from the line and replaced by a blind flange. The plug may be removed from the conduit by reversal of this procedure.

An object of this invention is to provide a plugging apparatus of this type which is of simplified construction in that it is simpler and cheaper to manufacture.

Another object is to provide such an apparatus which is less subject to being improperly operated so as to cause possibly hazardous conditions than the apparatus heretofore being marketed.

Another object is to provide such an apparatus in which a threaded connection employed to actuate the locking means for the plug is so arranged as to be isolated from working fluid in a pipeline or vessel and therefore is kept cleaner.

These and other objects are accomplished, in accordance with the present invention, by apparatus which includes a conduit adapted to be connected to a vessel, such as a pipeline, and a plug insertable into the conduit through one end thereof. The plug is locked in place by at least one locking element mounted on the conduit for reciprocation between a retracted position permitting passage of the plug transversely of the locking element and a locking position wherein the locking element engages the plug to restrain it from moving out of the conduit. The locking element is so actuated by rotating a nut which is rotatably disposed in and slidable longitudinally along a lateral bore through the conduit. The nut has a threaded connection with a connector which extends to engage the locking element so that as the nut is rotated, it will reciprocate the connector and the locking element between retracted and locking positions. Stops are also provided in the bore to be alternately engaged by the nut so that as the nut is rotated in one direction, it will engage one stop and then move the connector and locking element in one direction and when the nut is rotated in an opposite direction, it will engage the other stop and then move the connector and locking element in the opposite direction. In a preferred embodiment, the distance between the stops is greater than the length of the nut. This permits one stop to be provided by a bushing screwed into the outer end of the bore without having to maintain close tolerances on the degree the bushing is or can be screwed into the bore. The bushing can be provided with an opening therethrough for receiving a wrench to turn the nut. When the wrench is removed, this opening can be plugged so as to provide further assurance against leakage from the pressure vessel.

With this construction, the connector need not rotate to actuate the locking element. Therefore it can be connected to the locking element by a simple bifurcated connection, or equivalent, instead of the usual T-head connection. Also, the connector can carry a seal for movement along the bore to form a seal between the connector and bore without rotation of the seal. This seal is preferably located in the bore inwardly of the threaded connection between the connector and nut so that the latter is protected or isolated from fluids in the vessel.

In a preferred embodiment, the inner stop is provided by a shoulder between an outer larger diameter portion of the bore and an inner smaller diameter portion. The seal is carried by the connector to seal between it and the smaller diameter position of the bore as the connector is reciprocated by turning the nut. Normally the locking element will engage the conduit when in fully retracted position to limit makeup of the nut on the connector and hence limit the outward travel of the connector so as to maintain the seal within the smaller diameter portion of the bore. However, if excessive torque is applied to the nut so as to break the engagement of the connector with the locking element, means are provided to limit further makeup of the nut on the connector and the seal is located so as to remain within the smaller diameter portion of the bore when the nut has a maximum makeup on the connector and both have been displaced outwardly so that the nut is in engagement with the outer stop. This prevents escape of fluid from the vessel even when the apparatus has been so broken thereby adding to the safety of its use even under such adverse circumstances.

Figure 1:
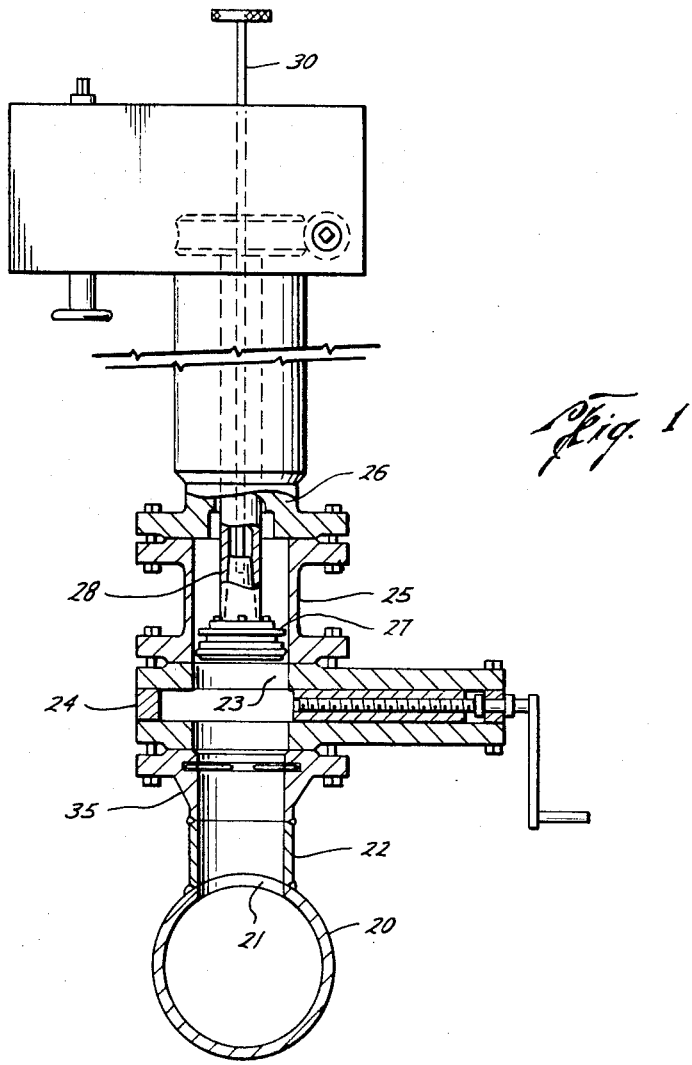
FIG. 1 is an elevational view, partly in section, of a pipeline having a tapping machine mounted over a hole therein, and showing the plug connected to the boring bar of the machine for insertion into the conduit connecting the pipeline and the machine.
Figure 2:
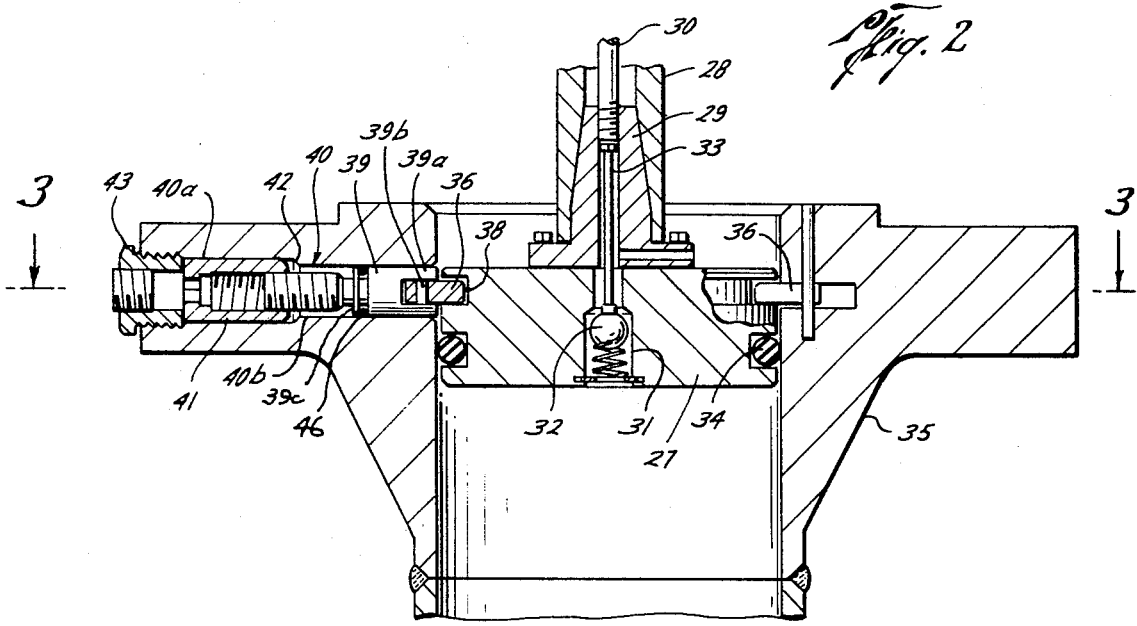
FIG. 2 is an enlarged sectional view with the plug inserted into the conduit and locked in placed by locking segments carried by the conduit.

Referring to the drawings, there is shown in FIG. 1 a pipeline 20 adapted to transport fluid under pressure and having a hole 21 through a wall thereof. A pipe stub or nipple 22 is welded to the pipeline in surrounding relation to the hole so as to form a conduit connecting the interior of the pipeline and a chamber 23 defined by the interior of the tapping valve 24, nipple 25 and the interior of tapping machine 26. The chamber 23 is elongate and generally cylindrical to permit movement of a plug 27 longitudinally therethrough into locking position within the conduit 22 as shown in FIG. 2.

Plug 27 is removably attached to the boring bar 28 by any suitable connection such as a plug holder 29 fitting into the lower end of the boring bar and held in place by a retainer rod 30. Plug 27 preferably has an opening 31 therethrough containing a check valve 32 which, when open, permits equalization of pressures across the plug. During landing, the check valve is held in open position by a push rod 33 abutting the lower end of the retainer rod. However when the latter is removed, the check valve will close to prevent further fluid flow across the plug.

The plug is preferably provided with an O-ring type seal situated in a groove in the periphery of the plug and forming a seal between the plug and the flanged fitting of 35.

Figure 4:
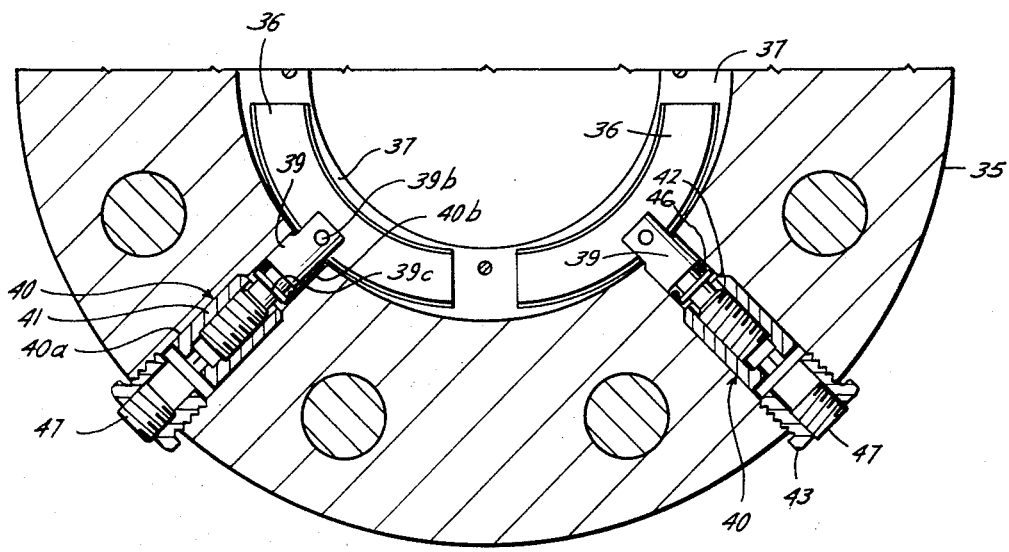
FIG. 4 is a view similar to FIG. 3 except that locking elements are shown in retracted position and the plug removed.

In order to lock the plug in place in the flanged fitting, the preferred embodiment employs a plurality of locking elements 36 which when retracted, as in FIG. 4, lie entirely within a peripheral groove 37 interiorly of the flanged fitting. These locking elements can be moved into a peripheral groove 38 in the plug as shown in FIG. 2 to lock the latter in place.

Actuating means are provided for reciprocating the locking elements as above indicated. Such means preferably include a connector 39 disposed in a lateral bore 40 extending through the flanged fitting. One end of the connector engages a locking element such as by positioning the locking element between bifurcations 39a and holding it in place by a locking pin 39b.

The other end of the connector has a threaded connection with a nut 41 which is rotatably disposed in and slidable longitudinally of an enlarged portion 40a of the bore 40. Means are provided to afford oppositely facing stops engageable by the nut and in this particular embodiment, one stop is provided by an outwardly facing shoulder 42 formed at the juncture of the enlarged bore portion 40a and the inner smaller diameter portion 40b and the other stop by the inner end of a bushing 43 screwed into the outer end of the bore 40. With this construction, nut 51 essentially "floats" in the enlarged bore 40a in that it is free to rotate therein as well as to move longitudinally therein to whatever degree the distance between the stops exceed the length of the nut. It is advantageous to make this distance sufficiently greater than the length of the nut such that the manufacturing and assembly tolerances are of minimal importance. Thus, for example, the extent to which the bushing 43 is screwed into the bore 40a can vary over a substantial range without interfering with rotation of the nut provided only that with theoretical maximum makeup of the threaded connection between the bushing and the flanged fitting, the distance between the two stops is greater than the length of the nut.

Figure 3:
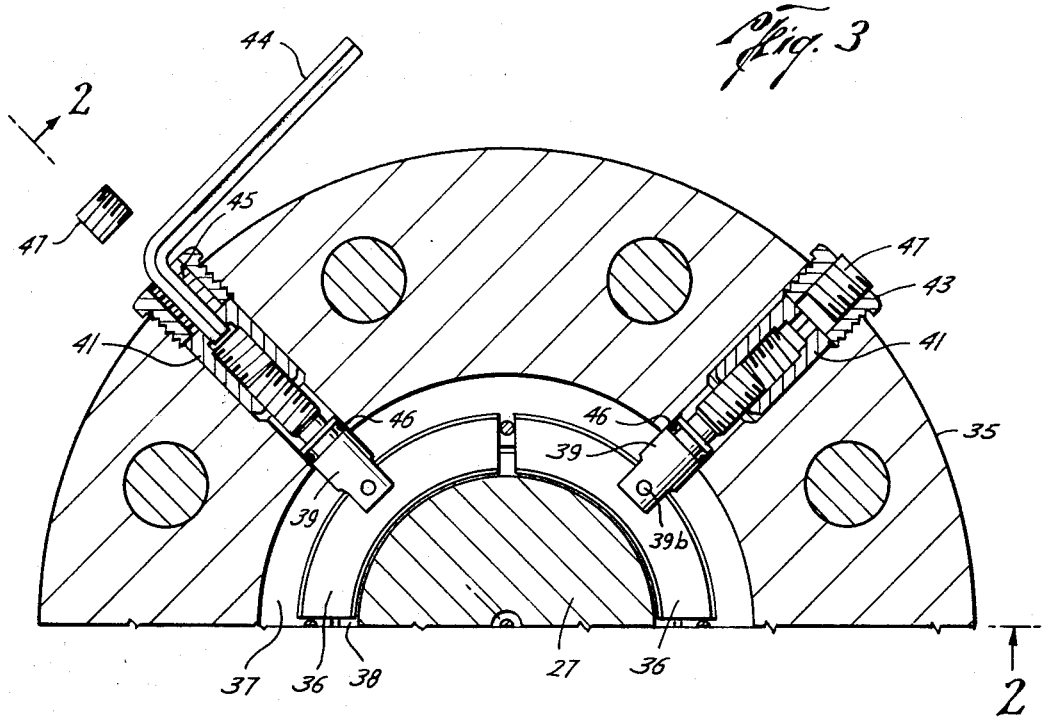
FIG. 3 is a half section taken on the line 3—3 of FIG. 2 and showing the locking elements in locking position in the plug.

With this construction, a wrench 44 can be inserted through a hole 45 through the bushing as shown in FIG. 3 and the nut 41 rotated to, for example, move the locking elements to retracted position. Usually the first increment of rotation of the nut will move it inwardly until it engages shoulder 42. Thereafter, further rotation will cause connector 39 and locking element 36 to be retracted to the FIG. 4 position. Conversely, when the locking element is to be moved to locking position as in FIG. 3, the first increment of movement of the nut will be outwardly to engage the bushing 43 after which the connector and locking element will be moved inwardly to the locking position. Thus it will be seen that the clearance or spacing mentioned above provides the nut with a lost motion.

The connector is preferably provided with a seal such as O-ring 46, to seal between the connector and the bore through the flange fitting. This effectively isolates the threaded connection between the nut and connector from fluids interiorly of the flanged fitting. Also by using the bifurcated connection to the locking element, the connector is prevented from rotating as it is reciprocated and this is desirable to the proper functioning of the seal while the locking elements are being actuated.

After the wrench has been removed, it is preferred to insert a plug 47 in the hole through the bushing to further guard against the possibility of leaks.

It will be seen from FIG. 4 that normally segments 36 when in fully retracted position will limit makeup of nut 41 on connector 39 by abutting the inner wall of groove 37. However, if sufficient excessive torque is applied to shear pin 39b, pressure acting on the inner end of the connector can cause it to move outwardly until the outer end of the nut engages the end of bushing 43. Further rotation of the nut will cause it to makeup on the connector until shoulder 39c abuts the inner end of the nut. Seal 46 is positioned inwardly of the threaded connection sufficiently so that when the above situation occurs, the seal will still be effective in the inner smaller diameter portion 40b of the bore. Thus, even with this extreme situation, leakage of fluid from the pressure vessel is not possible.

From the foregoing description of one embodiment of this invention by way of example, it will be seen that this invention is one well adapted to attain all of the ends and objects hereinabove set forth, together with other advantages which are obvious and which are inherent to the apparatus.

The invention having been described, what is claimed is:

1. Apparatus for forming a fluid tight closure of an opening in a vessel comprising: a conduit adapted to be connected to a vessel; a plug insertable into the conduit; at least one locking element mounted on the conduit for reciprocation between a retracted position permitting passage of the plug transversely of the locking element and a locking position wherein said locking element engages the plug to restrain it from moving out of the conduit; actuating means for so reciprocating said locking element including a nut rotatably disposed and longitudinally slidable in a lateral bore through the conduit, a connector slidably disposed in said bore and engaging said locking element to reciprocate the latter upon reciprocation of the connector and also having a threaded connection with the nut, means providing inner and outer oppositely facing stops engageable by the nut so that upon rotation of the nut in one direction, the nut will engage the outer stop and move the connector and locking element to locking position and, upon rotation in an opposite direction, the nut will engage the inner stop and move the connector and locking element to retracted position, said locking element normally engaging the conduit when in fully retracted position to limit the makeup of the nut on the connector, means limiting additional makeup of the nut on the connector when the engagement of the connector with the locking element is broken, and a seal carried by the connector to seal between said connector and bore and located sufficiently inwardly of the threaded connection as to maintain an effective seal with the bore when the nut has the maximum makeup on the connector and is engaging the outer stop.

2. The apparatus of claim 1 wherein said bore has an outer larger diameter portion and an inner smaller diameter portion with an outwardly facing shoulder therebetween providing said inner stop.

3. Apparatus for forming a fluid tight closure of an opening in a vessel comprising: a conduit adapted to be connected to a vessel; a plug insertable into the conduit; at least one locking element mounted on the conduit for reciprocation between a retracted position permitting passage of the plug transversely of the locking element and a locking position wherein said locking element engages the plug to restrain it from moving out of the conduit, actuating means for so reciprocating said locking element including a nut rotatably disposed and longitudinally slidable in a lateral bore through the conduit, a connector slidably disposed in said bore and engaging said locking element to reciprocate the latter upon reciprocation of the connector and also having a threaded connection with the nut, and means providing oppositely facing stops engageable by the nut so that upon rotation of the nut in one direction, the nut will engage one stop and move the connector and locking element to locking position and, upon rotation in an opposite direction the nut will engage the other stop and move the connector and locking element to retracted position.

4. The apparatus of claim 3 wherein a seal is carried by the connector to seal between the connector and said bore inwardly of the threaded connection therebetween, wherein the locking element is elongate and is disposed in an internal groove in the conduit and wherein the engagement of the connector with the locking element limits relative rotation therebetween whereby the threaded connection is isolated from fluid within the conduit and the seal is reciprocated with the connector without rotation.

5. The apparatus of claim 3 wherein said stop means includes a shoulder in said bore engageable with one end of the nut and a bushing threaded in the outer end of the bore and engageable with the other end of the nut, the distance between the stops thus provided being sufficiently greater than the length of the nut that the latter has a lost motion sufficient to accommodate variations in manufacturing tolerances.

6. The apparatus of claim 5 wherein said bushing has a threaded hole therethrough allowing insertion of a wrench to rotate the nut, and removable means plugging said hole.

7. The apparatus of claim 5 wherein said locking element normally engages the flange when in fully retracted position to limit the makeup of the nut on the connector, means limiting additional makeup of the nut on the connector when the engagement of the connector with the locking element is broken, and a seal carried by the connector to seal between the connector and bore and located sufficiently inwardly of the threaded connection as to maintain an effective seal with the bore when the nut has the maximum makeup on the connector and is engaging said one stop.

8. An apparatus adapted to be used to form a fluid tight closure of an opening in a vessel comprising: an annular pipe fitting having an outturned flange; at least one locking element mounted in an internal recess in the flange for reciprocation between a retracted position in said recess and a locking position in which at least a portion of the locking element extends from said recess; and actuating means for so reciprocating said locking element including a nut rotatably disposed in and longitudinally slidable along a lateral bore extending through the flange; a connector in said bore and longitudinally slidable therealong, said connector engaging the locking element to reciprocate the latter upon engagement with the nut; and means providing oppositely facing stops alternately engageable with the nut so that upon rotation of the nut in one direction, the nut will engage one stop and move the connector and locking element to locking position and, upon rotation in an opposite direction, the nut will engage the other stop and move the connector and locking element to retracted position.

9. The apparatus of claim 8 wherein said locking element is elongate and is disposed in an elongate recess and wherein the engagement of the connector with the locking element is formed by the inner end of the connector being bifurcated and receiving the locking element between the bifurcations, and a pin extending through the bifurcations and the locking element.

10. The apparatus of claim 9 wherein a seal is carried by the connector to form a sliding seal between the connector and bore.

11. The apparatus of claim 8 wherein the stops are provided by an outwardly facing shoulder in the bore and by a bushing screwed into the outer end of the bore, the distance between the stops being greater than the length of the nut so that the latter has a lost motion.

* * * * *